May 26, 1970 M. H. DAMON, JR 3,514,773

PULSE STORING SYSTEMS

Filed April 9, 1964

INVENTOR.
MELVIN H. DAMON, jr.

BY

Laurence S. Epstein
ATTORNEYS 3,514,773

PULSE STORING SYSTEMS

Melvin H. Damon, Jr., Wayne, N.J., assignor, by mesne assignments, to the United States of America as represented by the Secretary of the Navy Filed Apr. 9, 1964, Ser. No. 358,982
Int. Cl. G11b *5/06;* G08c *15/06*
U.S. Cl. 340—183 3 Claims

ABSTRACT OF THE DISCLOSURE

A system for storing analog information is disclosed wherein a plurality of modulators are fed by a plurality of signal inputs. A single clock controls the modulators and effects a time division multiplexing of the input signals. The modulator output signals are summed and fed into a doublet generator. The generator converts the information to doublets to be stored on a magnetic tape.

This invention relates to a novel system for storing intelligence. In particular, it relates to a signal storage system wherein analog intelligence information is stored by the use of amplitude modulation and timed division multiplexing.

Previously utilized systems rather than using doublet storage, as is utilized in the instant invention, used unipolar storage which is the system normally utilized in pulsed amplitude modulation sampling storage techniques. The use of the doublet storage techniques and the novel system of the instant invention, provides a more adequate, low frequency response than can be obtained with a unipolar storage system. In a preferred embodiment of the invention, the use of doublet storage techniques produces low frequency response which provides a more realistic simulation of the information sample which is stored and subsequently reproduced.

It is therefore an object of the instant invention to provide a novel system for the storing of analog information.

It is a further object of the instant invention to provide a novel system for the storage of analog information on a magnetic tape medium.

Yet another object of the instant invention is to provide a novel system for storing wide band analog information on a limited bandwidth medium.

Other objects and many of the attendant advantages of this invention will be readily appreciated as the same becomes better understood by reference to the following detailed description when considered in connection with:

Figures 1, 2:
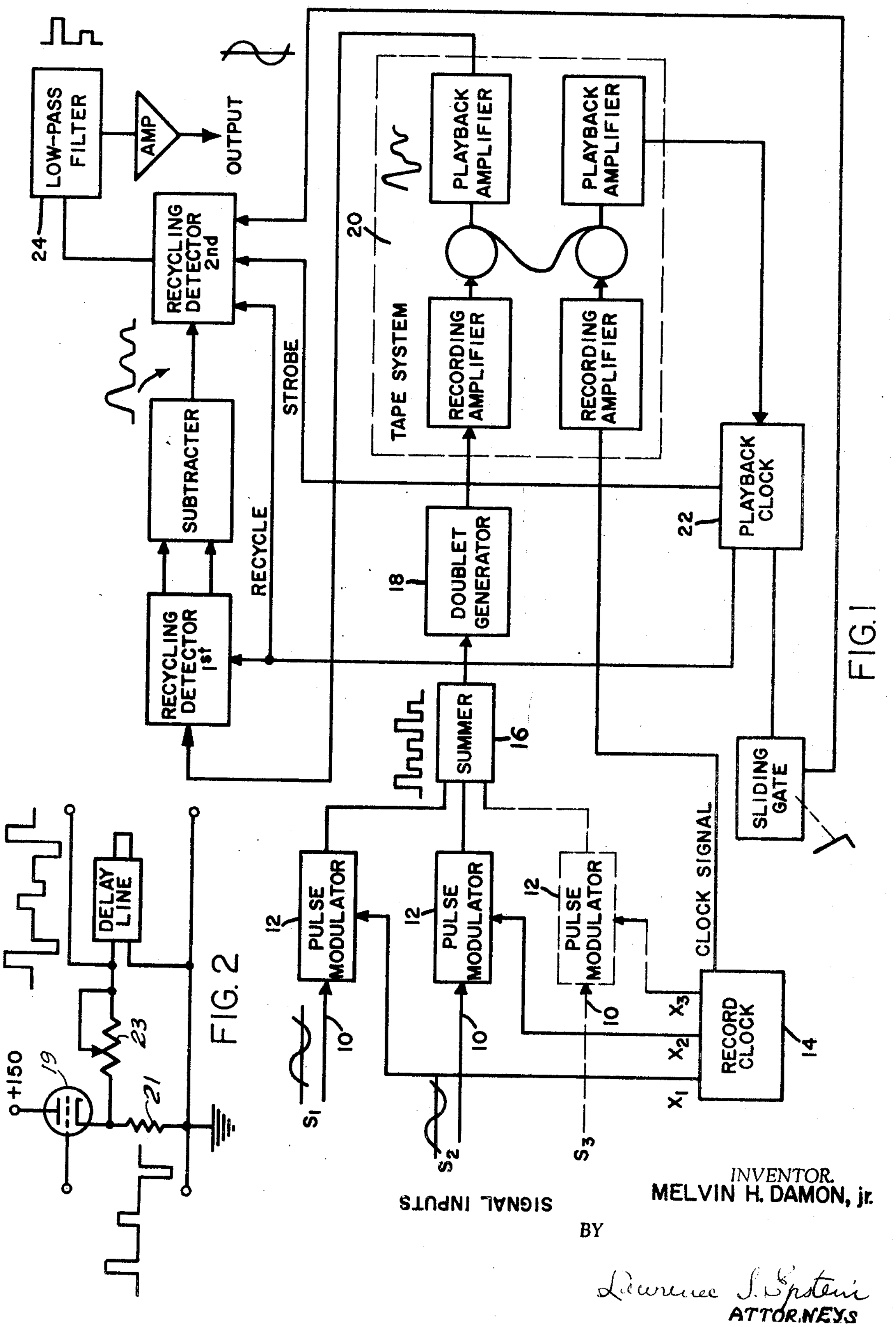
FIG. 1 is a block diagram of the pulse storing system.
FIG. 2 is a schematic of the doublet generator, partially in block form, which may be used in the system.

Referring now to FIG. 1, a number of channels of information 10 are sampled by pulse sampling techniques using pulse modulators 12 controlled by a clock signal 14. Each channel is then sampled for a predetermined time and the pulse information is then time-displaced in its proper relationship to all the other channel pulses. These pulses are then summed by a summer 16 and fed to a doublet generator 18. Referring, now to FIG. 2, the circuitry which is utilized to generate the doublet in the preferred embodiment of the invention is an impedance matching means comprising triode 19 and resistors 21 and 23 and a shorted delay line wherein the pulse that travels out of the delay line is totally reflected and travels back along the delay line to provide, at the input of the delay line, a doublet pulse. This doublet pulse is shown in the drawing. The doublet pulse is then stored on the recording medium 20, which is a magnetic tape and associated amplifiers and preamplifiers in a preferred embodiment of the invention. Upon re-creation of the channel information which is pulse sampled, this recorded doublet pulse sampling is played back by means of a playback clock 22 which is synchronized with the recording clock 14. The pulse sampled channel information is then recreated. Each doublet pulse is clipped so that only the details of the initial pulse information is reconstituted and the subsequent or lagging doublet pulse is eliminated. The details of reconstituting the initial pulse information and eliminating the subsequent lagging or doublet pulse can be accomplished by circuits which are well known in the art and therefore are not further described.

The synchronized pulse information is then demodulated, filtered, amplified and integrated by low-pass filter 24 and provided as a homogeneous output.

Thus it is seen by the use of simplified circuitry and the novel system of the instant invention, a system and means is provided for storing analog information on a limited bandwidth medium.

Obviously many modifications and variations of the present invention are possible in the light of the above teachings. It is therefore to be understood that within the scope of the appended claims the invention may be practiced otherwise than as specifically described.

What is claimed is:

1. Means for storing analog information on a limited bandwidth medium comprising, a source of signal inputs, a series of modulator means for each of said signal inputs, clock means, said clock means being operatively connected to said respective modulator means and said source of signal inputs being operatively connected to said respective modulator means, said clock means controlling the modulation of each signal input to provide time division multiplexing or sampling of said source of signal inputs, summing means, said summing means being operatively connected to each of said modulator means for summing the time multiplexed outputs of said modulators, doublet generator means, said doublet generator means being operatively connected to the output of said summer means for conversion of said summed time multiplexed modulated pulses into doublets, and storage means, said storage means being operatively connected to the output of said doublet generating means for storing said doublet generator information thereon.

2. The combination of claim 1 wherein said doublet generator comprises, an impedance matching means, and a shorted delay line, said impedance matching means being operatively connected to said shorted delay line whereby input time multiplex pulses from said summer are converted to doublet pulses by said delay line.

3. The combination of claim 2 and means for reproducing the analog information stored upon said storage means, said reproduction means comprising, a first recycling detector, and a subtractor, said subtractor being operatively connected to said first recycling detector, a second recycling detector, said second recycling detector being operatively connected to the output of said subtractor, playback clock means, said playback clock means being operatively connected to said first and second recycling connected to said first and second recycling detectors and controlled by the information stored on said storage means, selection gate means, said selection gate means being operatively connected between said playback clock means and said second recycling detector means, and low-pass filter means, said low-pass filter means being operatively connected to the output of said second recycling detector means whereby information stored upon said storage means is reshaped, timed, filtered and reproduced in accordance with said information stored upon said storage means.

References Cited

UNITED STATES PATENTS 3,268,814 8/1966 Du Vivier ------- 340—183 X

RODNEY D. BENNETT, Jr., Primary Examiner

B. L. RIBANDO, Assistant Examiner

U.S. Cl. X.R.

340—150, 174.1